United States Patent
Huang et al.

(10) Patent No.: US 9,770,823 B2
(45) Date of Patent: Sep. 26, 2017

(54) AUTO-REACH METHOD AND SYSTEM FOR A REMOTE VEHICLE

(71) Applicant: iRobot Corporation, Bedford, MA (US)

(72) Inventors: Wesley Hanan Huang, Burlington, MA (US); Emilie A. Phillips, Mason, NH (US)

(73) Assignee: IROBOT DEFENSE HOLDINGS, INC., Bedford, MA (US)

( * ) Notice: Subject to any disclaimer, the term of this patent is extended or adjusted under 35 U.S.C. 154(b) by 169 days.

(21) Appl. No.: 14/682,428

(22) Filed: Apr. 9, 2015

(65) Prior Publication Data

US 2015/0273684 A1    Oct. 1, 2015

Related U.S. Application Data

(63) Continuation of application No. 13/448,043, filed on Apr. 16, 2012, now Pat. No. 9,031,697.

(Continued)

(51) Int. Cl.
*B25J 5/00* (2006.01)
*B25J 9/16* (2006.01)
(Continued)

(52) U.S. Cl.
CPC .............. *B25J 5/005* (2013.01); *B25J 9/162* (2013.01); *B25J 9/1697* (2013.01); *B25J 11/002* (2013.01);
(Continued)

(58) Field of Classification Search
CPC ... B25J 5/002; B25J 5/005; B25J 5/007; B25J 9/16; B25J 9/162; B25J 9/1694;
(Continued)

(56) References Cited

U.S. PATENT DOCUMENTS 3,414,137 A      12/1968   Fortin
4,412,293 A  *   10/1983   Kelley ................. B25J 15/0266
                                                          414/730

(Continued)

FOREIGN PATENT DOCUMENTS

EP    1 428 634 A2    6/2004
EP    1 555 508 A1    7/2005

OTHER PUBLICATIONS

"Combined Arms Operations in Urban Terrain" [website pate online], U.S. Army Field Manual fm 3-06.11 Chapter 3, [retrieved on Aug. 5, 2009]. Retrieved from the internet at URL: http://www.globalsecurity.org/military/library/policy/army/fm/3-06-11/ch3.htm.

(Continued)

*Primary Examiner* — Michael McCullough
*Assistant Examiner* — Brendan Tighe
(74) *Attorney, Agent, or Firm* — Jenkins, Wilson, Taylor & Hunt, P.A.

(57) ABSTRACT

The present teachings provide a method of controlling a remote vehicle having an end effector and an image sensing device. The method includes obtaining an image of an object with the image sensing device, determining a ray from a focal point of the image to the object based on the obtained image, positioning the end effector of the remote vehicle to align with the determined ray, and moving the end effector along the determined ray to approach the object.

15 Claims, 11 Drawing Sheets

Related U.S. Application Data

(60) Provisional application No. 61/475,944, filed on Apr. 15, 2011, provisional application No. 61/605,552, filed on Mar. 1, 2012.

(51) Int. Cl.
*B25J 11/00* (2006.01)
*B25J 19/02* (2006.01)
*G05D 1/00* (2006.01)

(52) U.S. Cl.
CPC .......... *B25J 19/023* (2013.01); *G05D 1/0038* (2013.01); *G05B 2219/39391* (2013.01); *G05B 2219/40003* (2013.01); *G05B 2219/40062* (2013.01); *G05D 2201/0207* (2013.01); *G05D 2201/0209* (2013.01); *Y10S 901/09* (2013.01); *Y10S 901/47* (2013.01)

(58) Field of Classification Search
CPC ........ B25J 9/1697; B25J 13/08; B25J 13/085; B25J 13/086; B25J 13/088; B25J 15/0206; B25J 19/02; B25J 19/021; B25J 19/022; B25J 19/023; B25J 19/025; B25J 11/002; G05D 1/0038
USPC ........... 414/729, 730, 815; 700/259; 701/49; 901/1, 2, 9, 47
See application file for complete search history.

(56) References Cited

U.S. PATENT DOCUMENTS

| | | | |
|---|---|---|---|
| 4,613,269 A | 9/1986 | Wilder et al. | 700/259 |
| 4,696,501 A | 9/1987 | Webb | 294/86.4 |
| 5,086,901 A | 2/1992 | Petronis et al. | 192/150 |
| 5,142,677 A | 8/1992 | Ehlig et al. | 718/108 |
| 5,155,812 A | 10/1992 | Ehlig et al. | 710/59 |
| 5,161,846 A | 11/1992 | Yakou | 294/106 |
| 5,295,399 A | 3/1994 | Grant et al. | 73/862.043 |
| 5,308,221 A | 5/1994 | Shimokoshi et al. | 414/734 |
| 5,313,648 A | 5/1994 | Ehlig et al. | 712/228 |
| 5,319,789 A | 6/1994 | Ehlig et al. | 712/228 |
| 5,319,792 A | 6/1994 | Ehlig et al. | 712/228 |
| 5,349,687 A | 9/1994 | Ehlig et al. | 704/231 |
| 5,443,354 A | 8/1995 | Stone et al. | |
| 5,499,306 A | 3/1996 | Sasaki et al. | 382/291 |
| 6,377,872 B1 | 4/2002 | Struckman | 700/258 |
| 6,578,893 B2 | 6/2003 | Soucy et al. | |
| 6,816,755 B2 | 11/2004 | Habibi et al. | 700/259 |
| 6,826,450 B2 | 11/2004 | Watanabe et al. | 700/245 |
| 6,845,297 B2 | 1/2005 | Allard | 700/259 |
| 7,125,059 B2 | 10/2006 | Miyamoto | |
| 7,177,722 B2 | 2/2007 | Kato et al. | 700/262 |
| 7,209,803 B2 | 4/2007 | Okamoto et al. | 700/245 |
| 7,313,464 B1 | 12/2007 | Perreault et al. | 700/245 |
| 7,415,321 B2 | 8/2008 | Okazaki et al. | 700/245 |
| 7,645,110 B2 | 1/2010 | Ogawa et al. | |
| 7,789,443 B2 | 9/2010 | Gillespie et al. | |
| 7,818,091 B2 | 10/2010 | Kazi et al. | 700/259 |
| 7,877,165 B2 | 1/2011 | Sugiyama et al. | 700/245 |
| 7,983,794 B2 | 7/2011 | Kawabe et al. | 700/264 |
| 8,041,457 B2 | 10/2011 | Ohno | 700/259 |
| 8,155,787 B2 | 4/2012 | Chalubert et al. | 700/245 |
| 8,224,485 B2 | 7/2012 | Unsworth | 700/245 |
| 8,260,457 B2 | 9/2012 | Yokoyama | 700/245 |
| 8,315,740 B2 | 11/2012 | Hasegawa et al. | 700/260 |
| 8,322,249 B2 | 12/2012 | Seavey et al. | 74/490.01 |
| 8,326,469 B2 | 12/2012 | Phillips et al. | 701/2 |
| 8,392,036 B2 | 3/2013 | Jacobsen et al. | 701/2 |
| 8,426,761 B2 | 4/2013 | Takahashi et al. | 219/91.2 |
| 8,489,236 B2 | 7/2013 | Fudaba et al. | 700/245 |
| 8,577,517 B2 | 11/2013 | Phillips et al. | 701/2 |
| 8,606,398 B2 | 12/2013 | Eakins et al. | 700/245 |
| 8,781,629 B2 | 7/2014 | Ota | 700/259 |
| 2005/0131582 A1 | 6/2005 | Kazi et al. | 700/259 |
| 2005/0271279 A1 | 12/2005 | Fujimura et al. | 382/203 |
| 2008/0188985 A1 | 8/2008 | Sakano | 700/260 |
| 2009/0232506 A1 | 9/2009 | Hudson et al. | 398/106 |
| 2009/0320637 A1 | 12/2009 | Doyle et al. | |
| 2010/0017046 A1 | 1/2010 | Cheung et al. | 701/2 |
| 2010/0057252 A1 | 3/2010 | Kim | 700/245 |
| 2010/0068024 A1 | 3/2010 | Agens | 414/729 |
| 2010/0152899 A1 | 6/2010 | Chang et al. | 700/262 |
| 2010/0172733 A1 | 7/2010 | Chalubert et al. | 414/730 |
| 2010/0217436 A1 | 8/2010 | Jones et al. | 700/245 |
| 2010/0243344 A1 | 9/2010 | Wyrobek et al. | |
| 2010/0312392 A1 | 12/2010 | Zimmermann | 700/258 |
| 2011/0087360 A1 | 4/2011 | Chen et al. | 700/114 |
| 2011/0223000 A1 | 9/2011 | Martinez et al. | 414/730 |
| 2011/0223001 A1 | 9/2011 | Martinez et al. | 414/730 |
| 2011/0231016 A1 | 9/2011 | Goulding | 700/246 |
| 2011/0288667 A1 | 11/2011 | Noda et al. | 700/98 |
| 2012/0072023 A1* | 3/2012 | Ota | B25J 9/1664 700/259 |
| 2012/0330463 A1 | 12/2012 | Schreiber et al. | 700/260 |
| 2013/0325182 A1 | 12/2013 | Setrakian et al. | 700/264 |
| 2013/0330162 A1 | 12/2013 | Horinouchi | 414/730 |
| 2014/0156149 A1 | 6/2014 | Feit | 701/49 |

OTHER PUBLICATIONS

Andreopoulos, A. Tsotsos, J.K. "A Framework for Door Localization and Door Opening Using a Robotic Wheelchair for People Living with Mobility Impairments" RSS 2007 Manipulation Workshop: Sensing and Adapting to the Real World, Atlanta, Jun. 30, 2007.

Barnes, Mitch et al., "ThrowBot: Design Considerations for a Man-Portable Throwable Robot", In Proceedings of SPIE vol. 5804, Mar. 2005.

Bibby, M. Necessary, R., Robonaut [website page online], [retrieved on Aug. 5, 2009]. Retrieved from the internet at URL: http://robonaut.jsc.nasa.gov.

Bruemmer, D.J., Few, D.A. Dapoor, c., Goza, M., "Dynamic Autonomy for Mobile Manipulation" In Proc. of the ANS/IEEE 11th Annual Conference on Robotics and Remote Systems for Hazardous Environments, Salt Lake City, UT, Feb. 12-15, 2006.

Cheung, Carol et al. "UAV-UGV Collaboration with a PackBot UGV and Raven SUAV for Pursuit and Tracking of a Dynamic Target", In Proceedings of SPIE Defense and Security conference, Orlando, FL, Mar. 2008.

Jones, Chris et al. "Sentinel: An Operator Interface for the Control of Multiple Semi-Autonomous UGVs", In Proceedings of the Association for Unmanned Vehicles Systems International, Orlando, FL, Aug. 2006.

Lenser, Scott et al. "Practical problems in sliding scale autonomy: A case Study", In Proceedings of SPIE Defense and Security Conference, Orlando, FL, Mar. 2008.

Murray, Sean et al. "Continued Research in EVA, Navigation, Networking and Communications Systems" SAE Proceedings, International conference on Environmental Systems, Jun. 2008.

Rhee, C., Chung, W., Kim, M., Shim, Y. Lee H. "Door opening control using the multi-fingered robotic hand for the indoor service robot" Robotics and Automation, 2004, proceedings ICRA '04, 2004 IEEE International Conference , pp. 40111-4016, vol. 4, Apr. 26-May 1, 2004.

Rudakevych, Pavlo "Wave Control: A Method of Distributed Control for Repeated Unit Tentacles", In Proceedings of SPIE vol. 3839, Aug. 1999.

Rudakevych, Pavlo et al. "Micro Unattended Mobility System (MUMS)", In Proceedings of SPIE vol. 3713, Jul. 1998.

Rudakevych, Pavlo et al., "Integration of the Fido Explosives Detector onto the PackBot EOD UGV", In Proceedings of SPIE vol. 6561, Mar. 2007.

Rudakevych, Pavlo et al., "A man portable hybrid UAV/UGV system", In Proceedings of SPIE vol. 6561, Mar. 2007.

Rudakevych, Pavlo et al., "PackBot EOD Firing System", In Proceedings of SPIE vol. 5804, Mar. 2005.

(56) References Cited

OTHER PUBLICATIONS

Schoenfeld, Erik et al. "Door Breaching Robotic Manipulator" In Proceedings of SPIE Defense andSecurity Conference, Orlando, FL, Mar. 2008.
Sword, Lee et al. "Mobility Enhancements for Ballistically Deployed Sensors", In Proceedings of SPIE vol. 4393, Apr. 2001.
Yamauchi, Brian "All-Weather Perception for Small Autonomous UGVs", In Proceedings of SPIE Defense and Security Conference, Orlando, FL, Mar. 2008.
Yamauchi, Brian et al. "Griffon: a man-portable hybrid UGV/UAV", In Industrial Robot: An International Journal, vol. 31, No. 5, 2004.
Yamauchi, Brian, "Autonomous Urban Reconnaissance Using Man-Portable UGVs", In Proceedings of SPIE: Unmanned Ground Vehicle Technology VIII, Orlando, FL, Apr. 2006.
Yamauchi, Brian, "PackBot: A Versatile :Platform for Military Robotics", In Proceedings of SPIE vol. 5422: Unmanned Ground Vehicle Technology VI, Orlando, FL, Apr. 2004.
Yamauchi, Brian, "The Wayfarer Modular Navigation Payload for Intelligent Robot Infrastructure", In Proceedings of SPIE vol. 5804: Unmanned Ground Technology VII, Orlando, FL, Mar. 2005.
Yamauchi, Brian, "Wayfarer: An Autonomous Navigation Payload for the PackBot", In Proceedings of AUVSI Unmanned Vehicles North America 2005, Baltimore, MD, Jun. 2005.
Yamauchi, Brian. "Daredevil: Ultra Wideband Radar Sensing for Small UGVs", In Proceedings of SPIE: Unmanned Systems Technology IX, Orlando, FL, Apr. 2007.
International Search Report and Written Opinion Corresponding to International Application No. PCT/US2012/033790; Date of Mailing: Sep. 12, 2012; 8 Pages.
International Preliminary Report on Patentability Corresponding to International Application No. PCT/US2012/033790; Date of Mailing: Oct. 15, 2013; 6 Pages.

\* cited by examiner

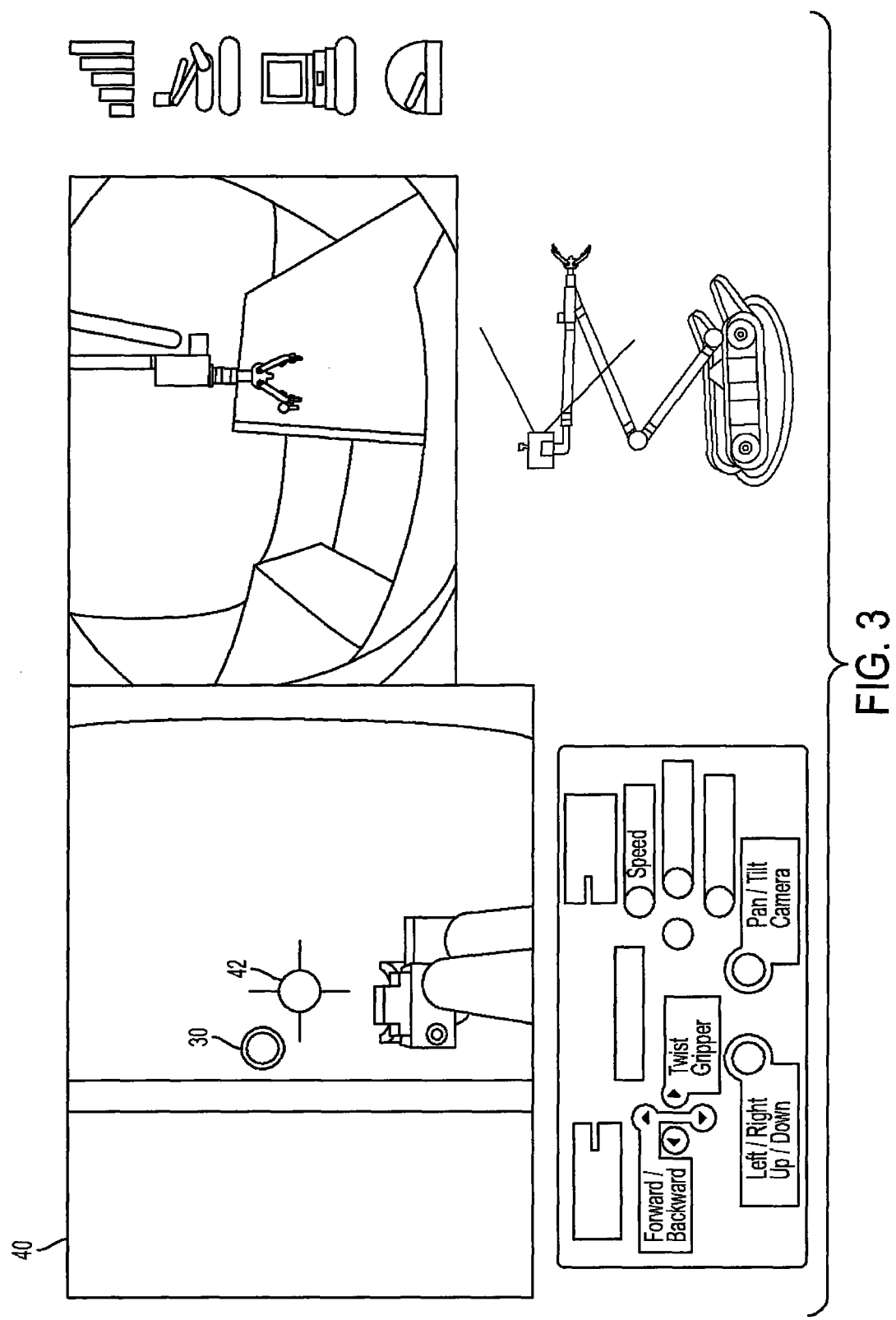

AUTO-REACH METHOD AND SYSTEM FOR A REMOTE VEHICLE

RELATED APPLICATIONS

This application is a continuation of U.S. patent application Ser. No. 13/448,043 filed on Apr. 16, 2012, which claims priority to U.S. Provisional Patent Application No. 61/475,944, filed Apr. 15, 2011, titled Auto-Reach Method for a Remote Vehicle and to U.S. Provisional Patent Application No. 61/605,552, filed Mar. 1, 2012, titled Mobile Inspection Robot, the disclosures of which are incorporated herein by reference in their entireties.

STATEMENT OF GOVERNMENT SUPPORT

This invention was made with government support under TACOM Contract No. W56HZV-09-C-0315 awarded by the U.S. Army Contracting Command, AMSCC-TAC-ASGD. The government has certain rights in the invention.

BACKGROUND

The present teachings relate to a method for controlling a remote vehicle, and in particular, a remote vehicle control method in which a remote vehicle payload is automatically positioned to approach an object within a field of view of a sensor.

Remote vehicles are useful in a variety of military, law enforcement, and other applications to provide for unmanned access to buildings, particularly in situations, such as earthquakes, hurricanes, fires, etc., in which human access is dangerous and therefore preferably avoided. As buildings typically consist of a multitude of individual rooms, which may are separated by doors that may be in a closed position, it is desirable for remote vehicles to have the ability to manipulate doors to enter rooms. It is also desirable to provide quicker and easier door opening abilities, either through an enhanced device, enhanced software, or a combination of both, to simplify remote operation and allow the remote vehicle to inspect a structure more quickly.

Currently, some remote vehicles are operated by users at remote locations, who utilize, for example, cameras or other image sensing devices to determine how to manipulate the remote vehicle and end effectors of the remote vehicle to traverse spaces, perform tasks, access doors, approach doorknobs, open the doors, grasp objects etc. Manually-controlled performance of some or all of these tasks can be time-consuming and require precision by the operator in order to correctly approach, access, and manipulate doorknobs to open the doors on which the doorknobs are disposed. Minimizing the amount of manual control by the operator would significantly reduce the amount of time and effort involved in opening a door.

SUMMARY

The present teachings provide a method of controlling a remote vehicle having an end effector and a two-dimensional image sensing device. The method includes obtaining an image of an object with the image sensing device, determining a ray from a focal point/pixel of the image sensed by the image sensing device and passing through the object, positioning the end effector of the remote vehicle at a point along the determined ray, and moving the end effector along the determined ray to approach the object.

The present teachings further provide a method of controlling a remote vehicle having an end effector and a two-dimensional image sensing device. The method includes displaying an image of an object obtained from the image sensing device and an object alignment symbol, the object alignment symbol representing a focal point of the image sensing device, and indicating a starting point of a ray originating from a focal point fixed in space with respect to the image sensing device, wherein the ray extends indefinitely because the depth of the object is not determinable from the two-dimensional image sensing device.

The present teachings also contemplate receiving an input to align the object alignment symbol with the displayed object image, causing a ray from the focal point of the image sensing device through the object to be determined based on the received input, causing the end effector of the remote vehicle to align with the determined ray, and causing the end effector to move along the determined ray to approach the object.

The present teachings additionally provide a method of controlling a remote vehicle having an end effector and an image sensing device. The method includes moving the image sensing device to a targeting pose to view an object within a field of view of the image sensing device, displaying an image of the object obtained from the image sensing device, moving the image sensing device to an object alignment position at which a focal point of the image sensed by the image sensing device is aligned with the displayed object, determining a ray from the focal point and extending through the object based on the displayed image, controlling the end effector of the remote vehicle to be positioned to align with the determined ray, and controlling the end effector to move along the determined ray to approach the object.

Additional objects and advantages of the present teachings will be set forth in part in the description which follows, and in part will be obvious from the description, or may be learned by practice of the present teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate an exemplary embodiment of the present teachings and together with the description, serve to explain the principles of the present teachings.

BRIEF DESCRIPTION OF THE DRAWINGS

FIG. 3 is an exemplary display facilitating a remote vehicle control method in accordance with the present teachings.

DESCRIPTION OF THE EMBODIMENTS

Figure 1A:
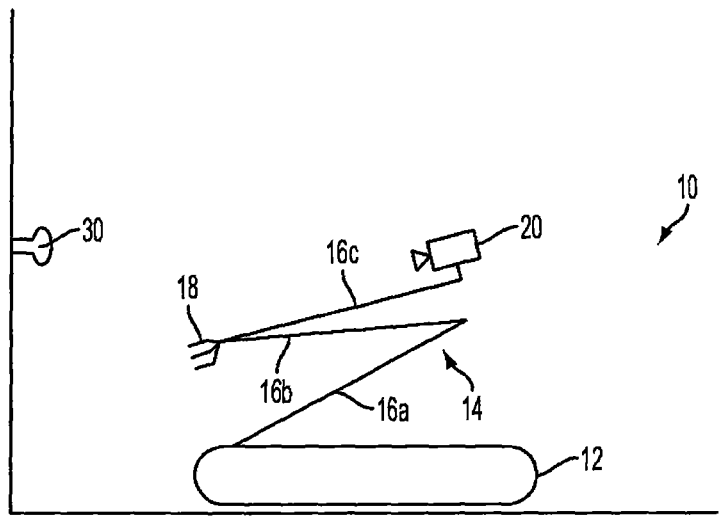
FIGS. 1A-1G illustrate a side view of an exemplary embodiment of a remote vehicle grasping a door knob, which can be accomplished using a control method and system in accordance with the present teachings.

Reference will now be made in detail to the exemplary embodiments of the present teachings, examples of which are illustrated in the accompanying drawings.

The present teachings provide a method of controlling a remote vehicle having an end effector and a two-dimensional image sensing device. The method includes displaying an image of an object obtained from the image sensing device and an object alignment symbol. The object alignment symbol can represent a focal point of an image sensed by the image sensing device, and can indicate a starting point of a ray originating from a focal point fixed in space with respect to the image. The ray extends indefinitely because the depth of the object is not determinable from the two-dimensional image sensing device.

The object alignment symbol represents the origin of the predetermined ray that extends from the focal point of the image sensed by the image sensing device to the object. In use, the operator can move the image sensing device (e.g., a camera attached to a manipulator arm of a remote vehicle) until a predetermined pixel on the image plane is aligned with the object. The present teachings also contemplate the remote vehicle system utilizing an object identification software to recognize the object (e.g., door handle/knob) and align the predetermined pixel of the image plane with the object such that the ray is created. Using such an automated identification feature would aid the operator in completing the task of grasping the object. Once the object is identified via software, the, ray can be created and the gripper can begin moving toward the object. Alternatively, operator confirmation can be required before creation of the ray and/or before the gripper begins to move toward the object.

In certain embodiments, the operator can adjust the robot and the image sensing device such that the gripper is positioned along the ray extending from the pixel through the object. Alternatively, the gripper can be autonomously moved to a location along the ray and thereafter move toward the object.

In various embodiments of the present teachings, the alignment symbol can be overlayed by the OCU on top of video image sent by image sensing device. The alignment symbol can be located anywhere on the video image, although it is shown herein to be located at the center of the video image. The illustrated cross hair represents a particular point on the image plane, and is the end point of the ray along which the gripper can travel to come into contact with the object. The present teachings contemplate that the operator can select a location of the object alignment symbol on the image and therefore the origin of the ray extending through the object. The location of the object alignment symbol can be selected, for example, simply by clicking at a desired location on the screen.

The disclosure herein describes an exemplary embodiment of an application of the present teachings wherein an operator selects the object to grasp/grip. However, those skilled in the art will understand, as stated above, that selection of the object can be accomplished by an automated feature recognition function of the remote vehicle system. The system and method of the present teachings are described herein as being used for door opening, but can also be used for grasping objects, for example to move the object to another location, to slide a drawer open, or to adjust a position of an object, without the need for 3D image sensing to provide a 3D location of the object that includes depth.

The foregoing general description, the following detailed description, and the accompanying drawings, are exemplary and explanatory only and are not restrictive of the present teachings, as claimed. The following detailed description and accompanying drawings set forth the best mode of the present teachings. For the purpose of teaching inventive principles, some aspects of the best mode may be simplified or omitted where they would be known to those of ordinary skill in the art.

The appended claims specify the scope of the present teachings. Some aspects of the best mode may not fall within the scope of the present teachings as specified by the claims. Thus, those skilled in the art will appreciate variations from the best mode that fall within the scope of the present teachings. Those skilled in the art will also appreciate that the features described below can be combined in various ways to form multiple variations of the present teachings. As a result, the present teachings are not limited to the specific examples described below, but only by the claims and their equivalents.

FIGS. 1A-1G illustrate a side view of an exemplary embodiment of a remote vehicle performing the task of grasping a door knob, which can be accomplished using a control method and system in accordance with the present teachings. FIG. 1A illustrates a remote vehicle in accordance with the present teachings in an initial position. The remote vehicle 10 includes a chassis 12 that allows the remote vehicle 10 to be driven over a surface. The chassis 12 can, for example, include wheels around a track can be disposed. The remote vehicle 10 further includes an expandable and retractable multi-unit manipulator arm 14. The multi-unit manipulator arm 14 may include a plurality of arm portions 16*a-c*. In accordance with certain embodiments of the present teachings, the remote vehicle can include more than one manipulator arm, as will be discussed hereinbelow.

The multi-unit manipulator arm 14 may include a first arm portion 16*a* that extends from the chassis 12. While FIG. 1A illustrates the first arm portion 16*a* extending from a front of the chassis 12, the first arm portion 16*a* may extend from any position on the chassis 12. In some embodiments, the first arm portion 16*a* may be connected to the remote vehicle chassis 12 via a joint that pivots with at least one degree of freedom. The multi-unit manipulator arm 14 may include a second arm portion 16*b* integrally connected with the first arm portion 16*a* via a joint that pivots with at least one degree of freedom. In some embodiments, the second arm portion 16*b* may extend from the first arm portion 16*a* at the rear of the remote vehicle 10 toward the front of the remote vehicle 10. In certain embodiments, at an end of the second arm portion 16*b* is positioned an end effector 18. The end effector 18 may be, for example, a gripping device that is able to grasp an object. In an exemplary embodiment, the end effector can comprise the gripper disclosed in U.S. patent application Ser. No. 12/406,100, filed Mar. 17, 2009, entitled Door Breaching Robotic Manipulator.

The multi-portion manipulator arm 14 may include a third arm portion 16c integrally connected with the second arm portion 16b via a joint that pivots with at least one degree of freedom. In some embodiments, the third arm portion 16c may extend from the second arm portion 16b at the front of the remote vehicle 10 toward the rear of the remote vehicle 10 as shown in FIG. 1A. An image sensing device 20 can be disposed at an end of the third arm portion 16c. The image sensing device 20 may be a camera, such as a monocular camera. One skilled in the art will appreciate that the image sensing device can be provided at a variety of locations on the remote vehicle, although the image sensing device preferably has a field of view that includes an environment surrounding the end effector 18.

Figure 1B:
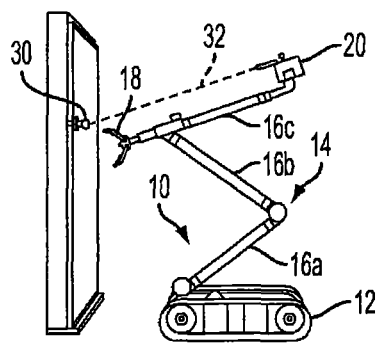
Figure 1C:
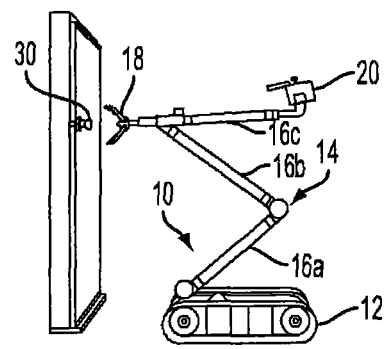
Figure 1D:
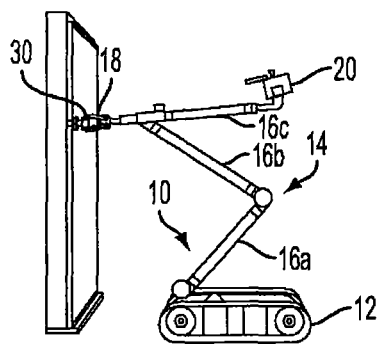
Figure 1E:
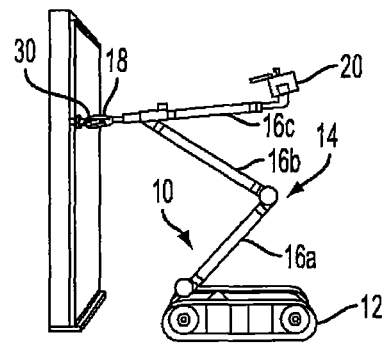
Figure 1F:
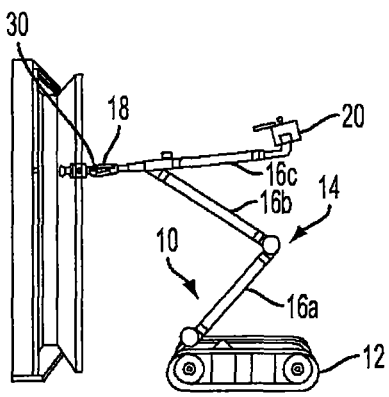
Figure 1G:
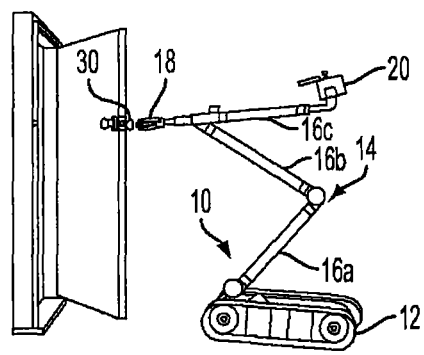
Figure 2:
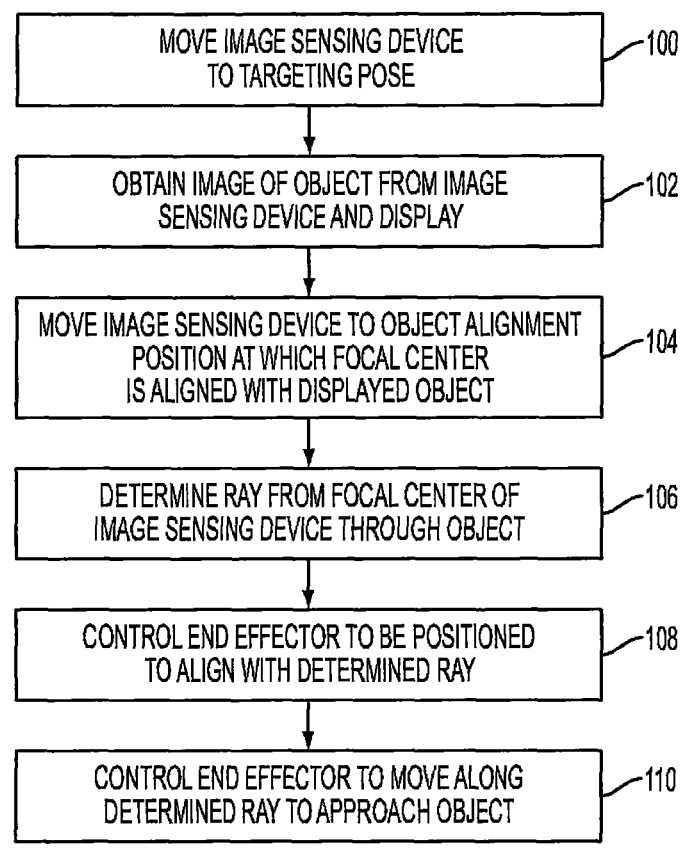
FIG. 2 is a flow chart illustrating an exemplary embodiment of a remote vehicle control method in accordance with the present teachings.

FIG. 2 is a flow chart of an exemplary embodiment of the remote vehicle control method in accordance with the present teachings, the steps of the method being generally illustrated in FIGS. 1A-1G. In the illustrated exemplary method, the image sensing device 20 is moved from an initial pose (see FIG. 1A) to a targeting pose (see FIG. 1B) to target an object, such as doorknob 30, in operation 100. While having a targeting pose can simplify the grasping process by bringing placing the end effector 18 and the image sensing device 20 into predetermined desirable positions for a task, for example close to the height of a typically door know if the task is to grasp a door handle/knob. Those skilled in the art will understand that the process of the present teachings can be performed without initially moving to a targeting pose. When utilized, movement to the targeting pose can be automated or performed manually by the operator. For example, an operator could drive the remote vehicle through a room in a drive pose and, upon reaching a door that he wishes to breach, the operator can move the remote vehicle's manipulator arm so that the image sensing device allows him to see, the object (e.g., the door handle/knob) and then make a ray trough the object and send the end effector along the ray in accordance with the present teachings to contact and grip the object. In preferred embodiments, the end effector approaches the object somewhat horizontally to improve its ability to grip the object if gripping is desirable. If a substantially horizontal approach is preferable but not utilized, the manipulator arm can be adjust after the object is contacted, for example by causing the manipulator arm portion 16c to become substantially horizontal.

In an exemplary targeting pose, the arm 14 of the remote vehicle 10, particularly the third arm portion 16c, can be moved to approximately the height of the object, such as doorknob 30 to move the field of view of the image sensing device 2Q to, for example, an approximate expected height of an object based on a predetermined and pre-stored approximate expected height. In the alternative, the image sensing device 20 may be moved to a targeting pose in which the object appears within a field of view of the image sensing device 20 without using predetermined or pre-stored data, for example, by having the operator move the manipulator arm 14 to the targeting pose using, for example, data supplied by the image sensing device 20. In the targeting pose, the third arm portion 16c may be tilted down in order to give the image sensing device 20, which is positioned at the back of the third arm portion 16c, a clear view of the object 30. The image sensing device 20 obtains an image of the object 30 at operation 102 in FIG. 2.

In certain embodiments of the present teachings, the method can assume that object is farther away than the starting gripper position. In accordance with the present teachings, once the ray extending through the object from the focal point of the image sensed by the image sensing device is determined, the image sensing device is no longer needed to complete the task (e.g., a door opening behavior) behavior. The end effector knows the coordinates of the ray and follows the ray until contacting the object. The coordinates of the ray can be determined because the system of the present teachings knows the position and orientation of the image sensing device with respect to the end effector; and the remote vehicle. The position and orientation of the image sensing device and the end effector are determined by forward kinematics. One skilled in the art will appreciate, however, that the method of the present teachings could continue to use the image sensing device by displaying an image of the end effector environment as the end effector moves forward to contact the target.

FIG. 1C shows the remote vehicle end effector 18 having moved to a position along the ray 32 as shown in step 108 in FIG. 2. FIG. 1D shows the remote vehicle end effector 18 contacting and gripping a door knob 3Q by moving along the ray as shown in step 110 of FIG. 2. FIG. 1E shows the remote vehicle end effector 18 turning the door knob 30. FIGS. 1F and 1G show the remote vehicle opening the door, which can be accomplished, for example, by driving the remote vehicle backward.

FIG. 3 is an exemplary embodiment of an operator control unit display configured to facilitate object alignment according to certain embodiments of a remote vehicle control method of the present teachings. Output from the image sensing device is shown in the upper left quadrant of the illustrated display, along with an exemplary targeting feature 42 that can be used as an object alignment symbol to indicate, to the operator, a focal point of the image sensing device. The lower right quadrant can display, for example, the remote vehicle's current pose. The lower left quadrant of the illustrated display can be used, for example, for a GUI such as buttons and or operator instructions that guide the operator through one or more steps of the targeting and door opening method described herein. The upper right quadrant of the illustrated display can include, for example, a video feed from a drive camera of the remote vehicle.

As shown in FIG. 3, for example, the image of the object 30 is obtained by the image sensing device 20 and is displayed on a display 40. At operation 104 of FIG. 2, an input is entered through an input unit 62 of an operator control unit (OCU) 90 (see FIG. 9) to cause the image sensing device 20 to move. The input unit 62 can comprise, for example, a joystick, a keyboard, or another suitable input device that allows the operator to move the image sensing device and/or its field of view. An operator is able to observe the object 30 within the field of view of the image sensing device and an overlayed object alignment symbol 42, such as a crosshair on the display 40, as shown in FIG. 3.

In certain embodiments of the present teachings, the object alignment symbol 42 represents a focal point of the image sensed by the image sensing device 20, and the starting point for a ray that will extend through the object and guide the end effector to the object. Using the display shown in FIG. 3, the operator inputs commands to move the object alignment symbol 42 to be aligned with the displayed object 30, and the object alignment commands are fed to the image sensing device 20 to cause the image sensing device 20 to move in the commanded direction. In the alternative, in various embodiments of the present teachings, the operator may automatically cause the alignment with the focal point of the image sensed by the image sensing device 20 by clicking on the object 30 shown in the displayed image. Thus, the focal point of the image is aligned with the object 30. Further, when the focal point of the image is aligned with the object 30 and the image sensing device is aligned with the end effector as shown in the illustrated embodiments of FIGS. 1A-1G and 3, the image sensing device 20 and the end effector 18 will approach from the same direction as the view from the image sensing device 20, which may be substantially level with the object 30 when a targeting pose is employed. Note that, as stated above, the ray need not originate from a center of the image, although the present teachings illustrate using the center of the image as an exemplary embodiment.

As shown in FIG. 1B and at operation 106 of FIG. 2, after an object has been targeted, a ray 32 is determined from the focal point of the image sensed by the image sensing device 20 to the object 30. The ray 32 may be determined by a processor 80 at the remote vehicle 10 (see FIG. 8) or by a processor 82 at the OCU 90 (see FIG. 8). The ray 32 can be determined by manually or automatically identifying a pixel coordinate of the object in the image obtained by the image sensing device 20. The ray 32 is calculated through the pixel coordinate in a reference frame of the image sensing device 20. The ray 32 is transformed into chassis space based on the position of the arm 14. For example, the length of the arm portions 16a-16c and the angle of the joints between the arm portions 16a-16c, in addition to the pan and tilt position of the image sensing device 20, can be used by the processor 80 or 82 to calculate the position and orientation of the image sensing device 20. The processor 80 or 82 can employ, for example, a known kinematics method in determining the ray 32 from the focal point of the image sensing device 20 to the object 30, and the calculated position and orientation of the image sensing device 20 and the pixel coordinate of the object 30 in the image, on which the ray calculation is based.

Figure 4A:
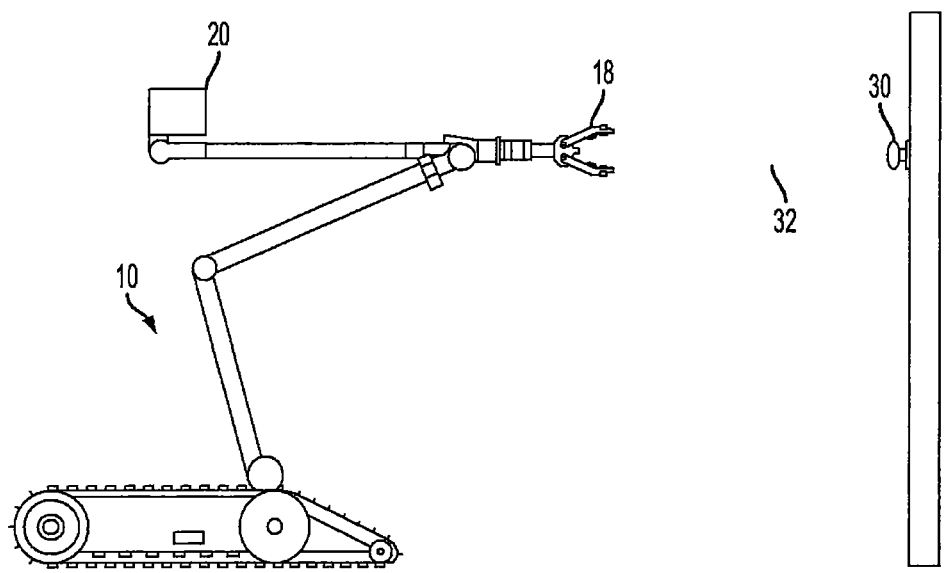
FIGS. 4A and 4B illustrate an object-approaching operation according to a remote vehicle controlling method in accordance with the present teachings.
Figure 4B:
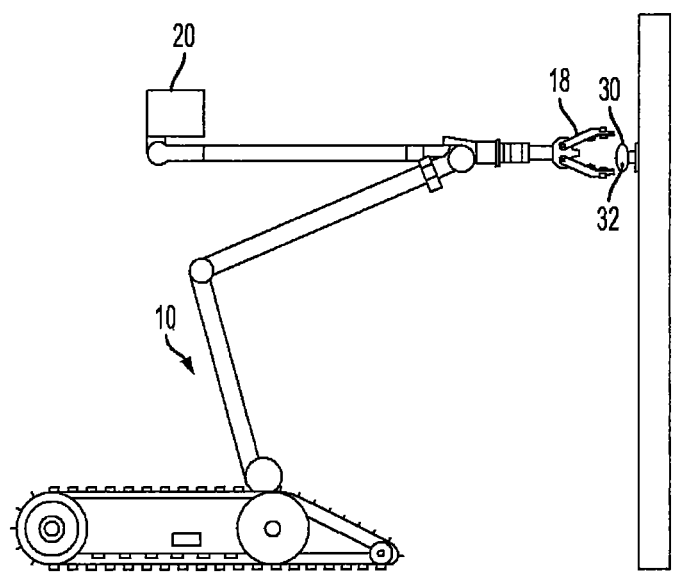

FIGS. 4A and 4B show additional views of the remote vehicle 10 approaching the object 30. As shown in FIG. 1C and FIG. 4A, at operation 108 of FIG. 2, the manipulator arm 14 is moved to position the end effector 18 onto the ray 32 that extends from the image focal point through the object. As stated above, joint encoders (not shown) on the arm 14 can be used to calculate the position and orientation of the image sensing device 20. For example, the position and orientation of each of the arm joints may be calculated and this data may be combined with a known length of each arm portion to determine a position of the image sensing device 20 so that the ray can be created and the end effector 18 can be aligned with the ray 32 to move along the ray 32 toward the object 30. In various embodiments of the present teachings, the third arm portion 16c that extends between the image sensing device 20 and the end effector 18 can be moved to be substantially horizontal when the end effector 18 is moved onto the ray 32, so that the end effector 18 approaches the object 30 horizontally when the object 30 is a doorknob or other item that benefits from a horizontal approach for gripping.

After the end effector 18 is moved onto the ray 32, at operation 110 of FIG. 2, the end effector 18 is moved along the ray 32 toward the object 3Q (see FIGS. 1D and 4B), by moving the chassis 12 toward the object and/or by moving the manipulator arm 16 toward the object 30. The movement of the remote vehicle 10 toward the object 30 is terminated when it is detected that the end effector 18 has reached a suitable position with respect to the object 30. The detection that the end effector 18 has reached a suitable position with respect to the object 30 may occur by, for example, detecting that the end effector 18 has contacted the object or a surface in close proximity to the object. In certain embodiments, contact with the object or a proximate surface can be detected, for example, by sensing an increase in current to a motor (not shown) driving the chassis 12 or the manipulator arm 16 toward the object. The detection may alternatively occur when an operator determines, for example via visual recognition, that the end effector 18 has reached by the object 30 and inputs detection data to the processor 80 or 82 in communication with the remote vehicle 10. When the end effector 18 is determined to have reached a suitable position with respect to the object, for example contacting the object or a surface proximate thereto, the auto-reach motion can be halted.

Additional sensors may be used to aid in the remote vehicle door opening or in the detection that the end effector 18 has reached the object 30, such as contact-type sensors and non-contact sensors. For example, the detection sensor can include a force sensor, an IR range sensor, a contact sensor, or a mechanical limit switch at the end effector 18. Contact-type sensors generally rely, on physical interaction of some component of the sensor body directly with the target object, for example, a mechanical limit switch. Non-contact sensors utilize less intrusive methods, which are typically based on radiated and received forms of energy, for example, a capacitive proximity sensor. As an example, an infrared-based photo interrupt or "break-beam" sensor and an infrared proximity sensor may be used. When used together, the "break-beam" sensor and the infrared proximity sensor can provide objective feedback to support the task of approaching and grasping an object. The infrared proximity sensor may be used to determine the relative distance between the sensor and the object, such as a doorknob. The "break-beam" sensor can be used to determine when an object moves between fingers of a gripper-type end effector 18 and is ready to be grasped. Other exemplary detection sensors can include an ultrasonic ranger sensor, which can provide simple data regarding distance to a point and a laser range finder that sends a single beam to measure distance to a specific point. Therefore, data regarding the distance to the object or the surface on which the object is located and whether the object is ready to be grasped can help increase the accuracy and reliability of the end effector approach and positioning and decrease the time needed for the approach and object grasping. A range-type detector can, for example, be mounted to the side of the image sensing device 20.

Although not required for the method described herein, a LIDAR sensor can be utilized on a remote vehicle in accordance with the present teachings. LIDAR is a laser rangefinder that scans over a relatively large swath, and can create a 3D map of the remote vehicle's surroundings, which may be used to more accurately and quickly open a door. An example of a door-opening algorithm using learning-based vision strategies and probabilistic reasoning include a general algorithm to recognize door handles in unstructured environments using vision, for example as discussed in Klingbeil et al., "Learning to Open New Doors," RSS Workshop on Robot Manipulation, 2008, the disclosure of which is incorporated herein by reference in its entirety.

As shown in FIGS. 1E-1G, the end effector 18 grips (and, in some applications, turns or levers) the object 30 and pulls the object 30 toward the remote vehicle 10 to open the door on which the knob 30 is located. While the object 3Q is shown and described as, for example, a door knob, the object 30 may be any of a variety of objects that are to be repositioned. For example, the object may be a piece of debris that is to be moved out of the remote vehicle's path, a portion of a door other than a door knob, a drawer that the operator wishes to open, a sample to be stored and taken to another location, etc.

Figure 5A:
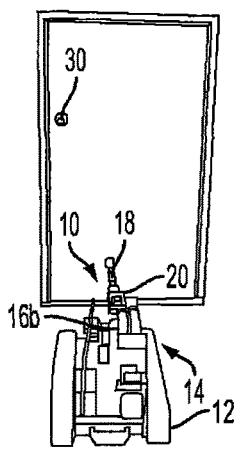
FIGS. 5A-5F illustrate rear views of an exemplary embodiment of a remote vehicle grasping a door knob, which can be accomplished using a control method and system in accordance with the present teachings.
Figure 5B:
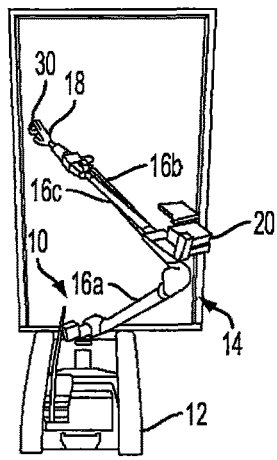
Figure 5C:
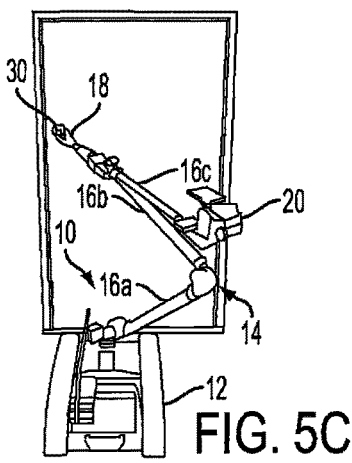
Figure 5D:
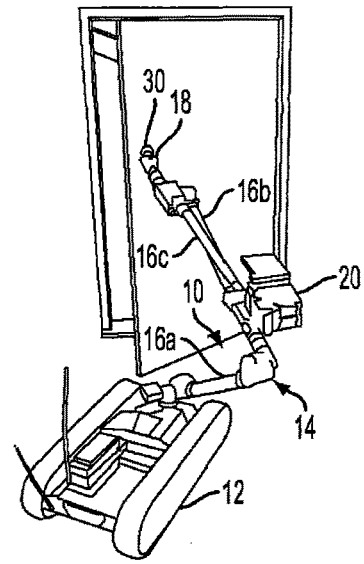
Figure 5E:
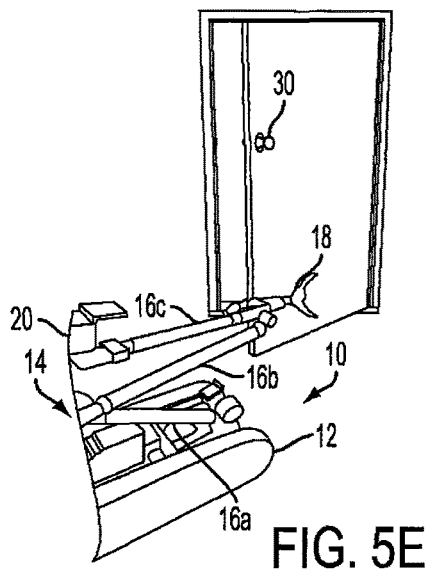
Figure 5F:
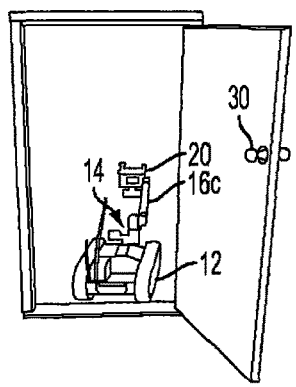

FIGS. 5A-5F show additional (rear) views illustrating an exemplary embodiment of a remote vehicle grasping a door knob and opening a door using a control method in accordance with the present teachings. FIG. 5A illustrates an initial pose of the remote vehicle 10 which can be, for example, a driving pose as the remote vehicle traverse toward the door. The initial pose can also include, for example a stowed pose or a targeting pose. FIG. 5B illustrates the end effector 18 after the end effector 18 has been aligned with the determined ray 32, moved to approach the door knob 30 along the determined ray 32 and gripped the door knob 30. FIG. 5C illustrates the end effector 18 turning the door knob 30. FIG. 5D illustrates the remote vehicle 10 opening the door. As can be understood from viewing the figures, the manipulator arm 14 and/or the chassis 12 can move to open the door (e.g., the remote vehicle can pull on the door to swing it open as shown, or can push the door open). FIG. 5E illustrates the end effector 18 disengaging from the door knob 30 after the door has been opened. In the illustrated embodiment, the remote vehicle 10 can back away from the door in FIG. 5E and position itself properly before moving through the door in FIG. 5F.

Figure 6:
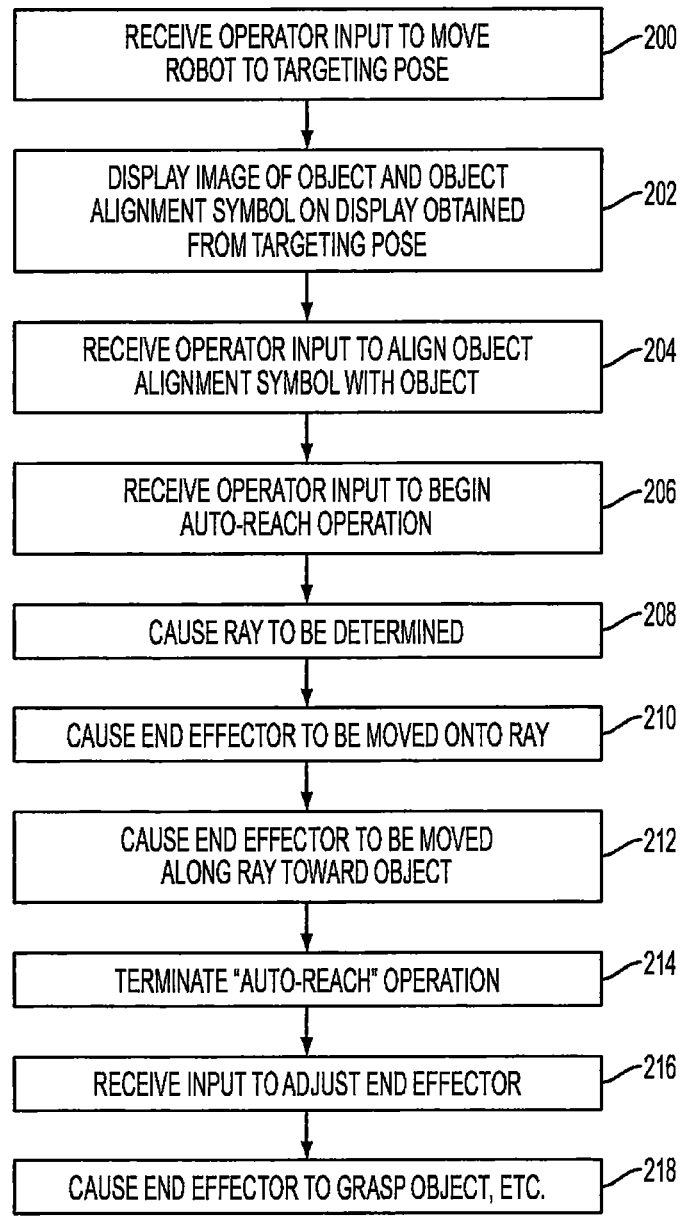
FIG. 6 is a flow chart illustrating an exemplary embodiment of a remote vehicle control method in accordance with the present teachings.

FIG. 6 is a flow chart of an exemplary embodiment of a remote vehicle control method in accordance with the present teachings. In certain embodiments of the present teachings, the remote vehicle (e.g., via an operator control unit or via a behavior running on the operator control unit or the remote vehicle) initially receives input to move the remote vehicle to a targeting pose, as shown in operation 200. As stated above assuming an initial targeting pose is an optional step in the method of the present teachings. To build the ray, an image from an image sensing device is displayed to the operator (e.g., on a display of an operator control unit) and an object alignment symbol is also displayed (see FIG. 3) in operation 202. In the illustrated exemplary embodiment, the object alignment symbol is then aligned with a targeted object in operation 204, and operator input is received to begin an auto-reach operation in step 206. Thereafter, a ray can be determined by a processor on the remote vehicle or the operator control unit in operation 208, and the end effector can be moved onto the ray and along the ray in steps 210 and 212. Once the end effector reaches the object, auto-reach can be terminated in operation 214. The end effector can then be adjusted to grasp and/or otherwise manipulate the object in steps 216 and 218, which can be done either manually by the operator or as part of an automated behavior.

Figure 7A:
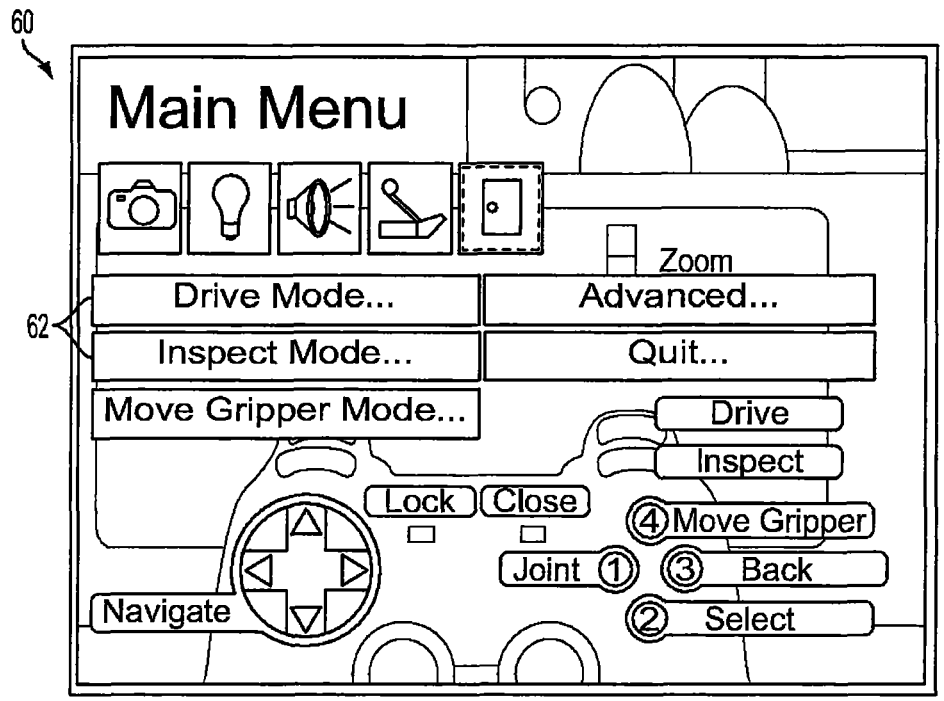
FIGS. 7A and 7B illustrate exemplary aspects of a display in accordance with a remote vehicle control method and system of the present teachings.
Figure 7B:
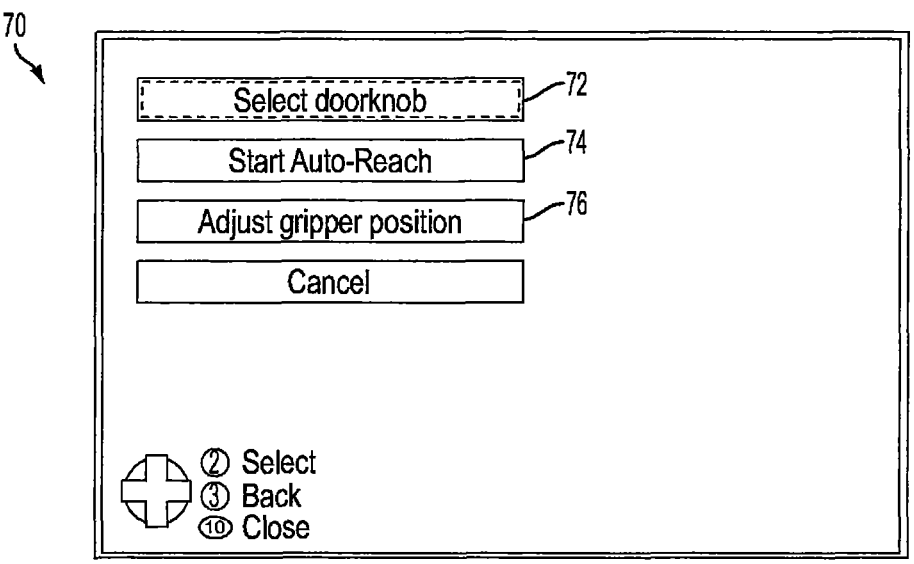

FIGS. 7A and 7B show exemplary embodiments of the lower left quadrant of the display illustrated in FIG. 3, for example a graphical user interface (GUI) including buttons that can guide the operator through one or more steps of the targeting and door opening method described above in the exemplary embodiment of the present teachings.

FIG. 7A shows an exemplary main menu display 60 including various input selections 62 such as a drive mode, and inspect mode, and a move gripper mode The main menu 60 can be provided as part of an OCU display 90 (an exemplary embodiment of which is utilized in the bottom left quadrant of the exemplary display of FIG. 3). At the top of the illustrated main menu are icons allowing the operator to, from left to right: take a picture from a camera mounted on the remote vehicle; turn on one or more lights (e.g., a driving light) of the remote vehicle; turn on a speaker of the remote vehicle; selected from a number of pre-programmed remote vehicle poses (e.g., targeting, drive, or prairie dog pose); or open a door in a manner provided in the present teachings. In certain embodiments, when the operator selects the icon to open a door, the interface illustrated in FIG. 7B can be displayed to guide the operator through a door opening procedure. In the interface of FIG. 7A, the operator may also select a "drive mode" using one of buttons 62, for example, which may assist the user in driving the remote vehicle and cause the remote vehicle to drive in a known manner.

In a drive mode, the operator may drive the remote vehicle to approach an object 30. In a "drive" pose, a multi-unit manipulator arm 14 in accordance with the present teachings may be, for example, in a position similar to a stowed position, but with the arm slightly elevated so that the image sensing device is raised I predetermined amount above the chassis to provide image sensing data while keeping a center of gravity of the remote vehicle low. The operator can also select an "inspect mode" or a "move the gripper mode" allowing the operator to manually move the manipulator arm to position and manipulate the gripper. Advanced options may also be available, and the operator can also "quit" the main menu. As shown in the exemplary embodiment of FIG. 7A, an interface in accordance with the present teachings and for use in methods of the present teachings can assist the operator by providing—for example at a bottom portion of the display area—a diagram labeling each of the buttons on an input device (e.g., a hand-held controller) that the operator may use to control the remote vehicle.

FIG. 7B illustrates a door-opening menu 70 including input selections 72-76 that an operator may select. At operation 200 of the exemplary method of FIG. 6, which can be implemented with the menu of FIG. 7B, the operator can provide an input through the door-opening menu 70. For example, the operator may initially choose "select doorknob" 72 as an input from the door-opening menu 70. This selection can, for example, put the remote vehicle 10 in a pose suitable for targeting the object 30 and cause or allow an object alignment symbol to be displayed in the image displayed to the operator from the image sensing device on the manipulator arm. The object 30 may be, for example, a doorknob. In embodiments of the invention wherein a targeting pose is not utilized, the "select doorknob" can merely cause or allow the object alignment symbol to be displayed in the image displayed to the operator from the image sensing device on the manipulator arm.

In embodiments utilizing a targeting pose, the manipulator arm 14 can, for example, be raised to a typical doorknob height, the image sensing device 20 can be pointed forward to view the end effector and its environment, and an object alignment symbol representing a focal point of the image sensed by the image sensing device 20 (see FIG. 3, for example) can be displayed within the video provided from the image sensing device 20. At operation 202 of FIG. 6, after an image of the object is obtained from the image sensing device 20, the image is displayed on display 40 of FIG. 3 with an overlayed object alignment symbol 42.

At operation 204, by utilizing the GUI, for example through the main menu 60 of FIG. 7A, the operator can provide commands to move the articulated arm 16 and/or the remote vehicle 10 to align the object alignment symbol 42 with the doorknob 30. The movement commands are sent to the remote vehicle 10.

After the object has been located at a focal point of the image sensed by the image sensing device at operation 206 of FIG. 6, the operator may thereafter select the "start auto-reach" 74 input selection of FIG. 7B. By selecting the "start auto-reach" 74 input selection, an autonomous behavior of the remote vehicle 10 is triggered. At operation 208, >a ray 32 from the focal point of the image sensed by the image sensing device 20 and extending through the object 30 is determined based on the received input. The ray 32 may be determined by the processor 80 at the remote vehicle 10 or by the processor 82 at the OCU 90. One skilled in the art will understand that the ray can be determined as part of either the "select doorknob" function or the "start auto-reach" function. At operation 210 of FIG. 6, the end effector 18 is aligned with the determined ray 32. At operation 212, the end effector 18 is moved along the determined ray 32 to approach the object 30. At operation 214, the auto-reach operation is terminated. The auto-reach operation may be terminated, for example, by sensing increased motor torque when the end effector 18 makes contact with the surface on which the object 30 is disposed. The auto-reach operation may alternatively be terminated manually by selecting a "stop auto-reach" input selection, or by analysis of data from other sensor types as discussed above.

After the auto-reach operation has terminated at operation 214, the end effector 18 or gripper may be adjusted when the operator selects an "adjust gripper position" 76 input selection in the exemplary GUI of FIG. 7B. Thereafter, the OCU 90 can be placed in a "move gripper mode" (see FIG. 7A). The "move gripper mode" and additional steps can be performed manually by the operator. The end effector 18 may be moved up/down, left/right, or forwards/backwards using, for example, inputs available on a hand-held controller, to put the end effector 18 in a better position for grasping the doorknob 30. The present teachings also contemplate, however, an autonomous or semi-autonomous behavior being utilized to move the gripper to grasp the object. Thereafter, at operation 216, the end effector 18 may be closed over the doorknob 30, the doorknob 30 may be turned, and the door on which the doorknob 30 is disposed may be opened by driving the remote vehicle 10 backwards. Additionally or alternatively, the manipulator arm 14 may be manipulated to swing the door open wider. The remote vehicle is then driven through the door in a "drive mode" (see FIG. 7A).

Figure 8:
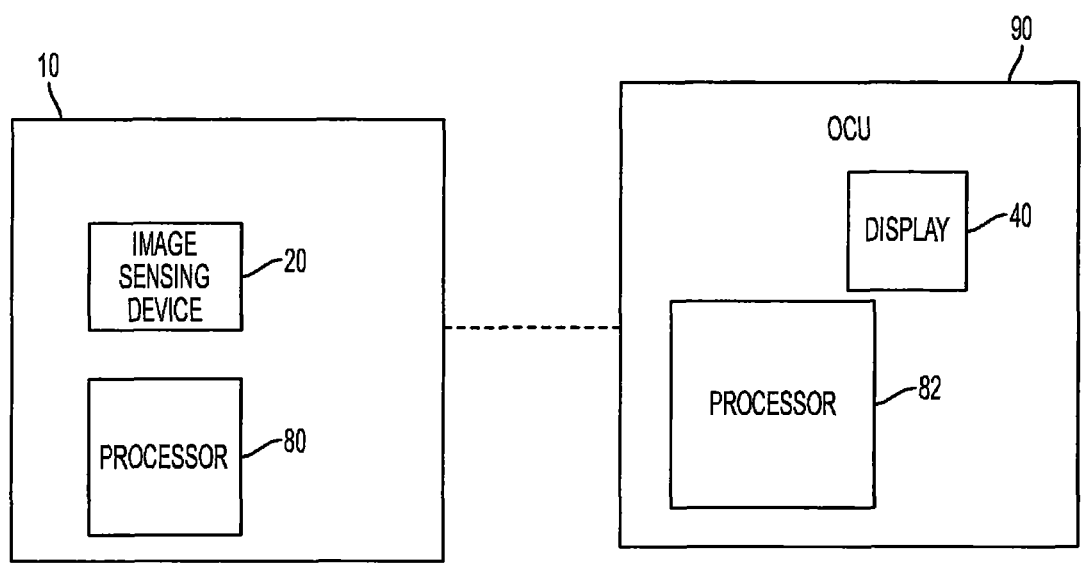
FIG. 8 is an exemplary embodiment of a schematic system diagram in accordance with the present teachings.

FIG. 8 is a system diagram in accordance with an exemplary embodiment of the present teachings. The remote vehicle 10, which includes the image sensing device 20, may also include a processor 80 to control the manipulator arm 14 as discussed hereinabove. As discussed above, the processor 80 may calculate a ray 32 using data from an image sensing device and encoders provided on the manipulator arm 14. The remote vehicle 10 is in communication, either wirelessly or wired, with an operator control unit (QCU) 90. The OCU 90 can include a display 40. In the alternative, the display 40 may be separate from the OCU 90 and may be in communication with the OCU 90. The OCU 90 includes a processor 82, which may be used to calculate the ray 32 and additionally cause the manipulator arm 14 to be moved, based on input received at the OCU 90. Alternatively, the processor 80 of the remote vehicle 10 can calculate the ray 32 and/or cause the manipulator arm 14 to be moved.

The present teachings contemplate that the manipulator arm 14, including the joints therein and its attachment to the remote vehicle chassis, includes enough degrees of freedom to all the manipulator arm to follow the ray 32 and to manipulate the object 30.

In certain embodiments of the present teachings, the image sensing device and the end effector may not be fixed in the same plane, for example they may not be connected via an arm 16c of FIGS. 1A-1G. In the exemplary embodiment of FIG. 9, an image sensing device 120 is connected to a chassis 112 of the remote vehicle 10 via a two part manipulator arm 116a, 116b having joints and mountings with one or more degrees of freedom and also including encoders. An end effector 118, for example the illustrated gripper, is attached to the chassis 112 via another two-part manipulator arm 117a, 117b having joints and mountings with one or more degrees of freedom and also including encoders. In this embodiment, the end effector 118 and the image sensing device 118 do not necessarily remain in the same plan as the remote vehicle performs its mission. While the method for determining a ray 132 from a focal point of an image sensed by the image sensing device 120 through an object 130 to be contacted and manipulated can remain substantially the same, and positioning of the end effector 118 in the ray 132 and movement of the end effector 118 along the ray 132 to contact the object 130 can remain substantially the same, determining the ray coordinates can be more complex in this embodiment because the image sensing device 120 and the gripper are independently connected to the chassis and need not remain in the same plane. As one skilled in the art will understand, the coordinates of the ray can be determined because the system of the present teachings knows the position and orientation of the image sensing device and the end effector with respect to the remote vehicle. The position and orientation of the image sensing device and the end effector are determined by forward kinematics.

Figure 9:
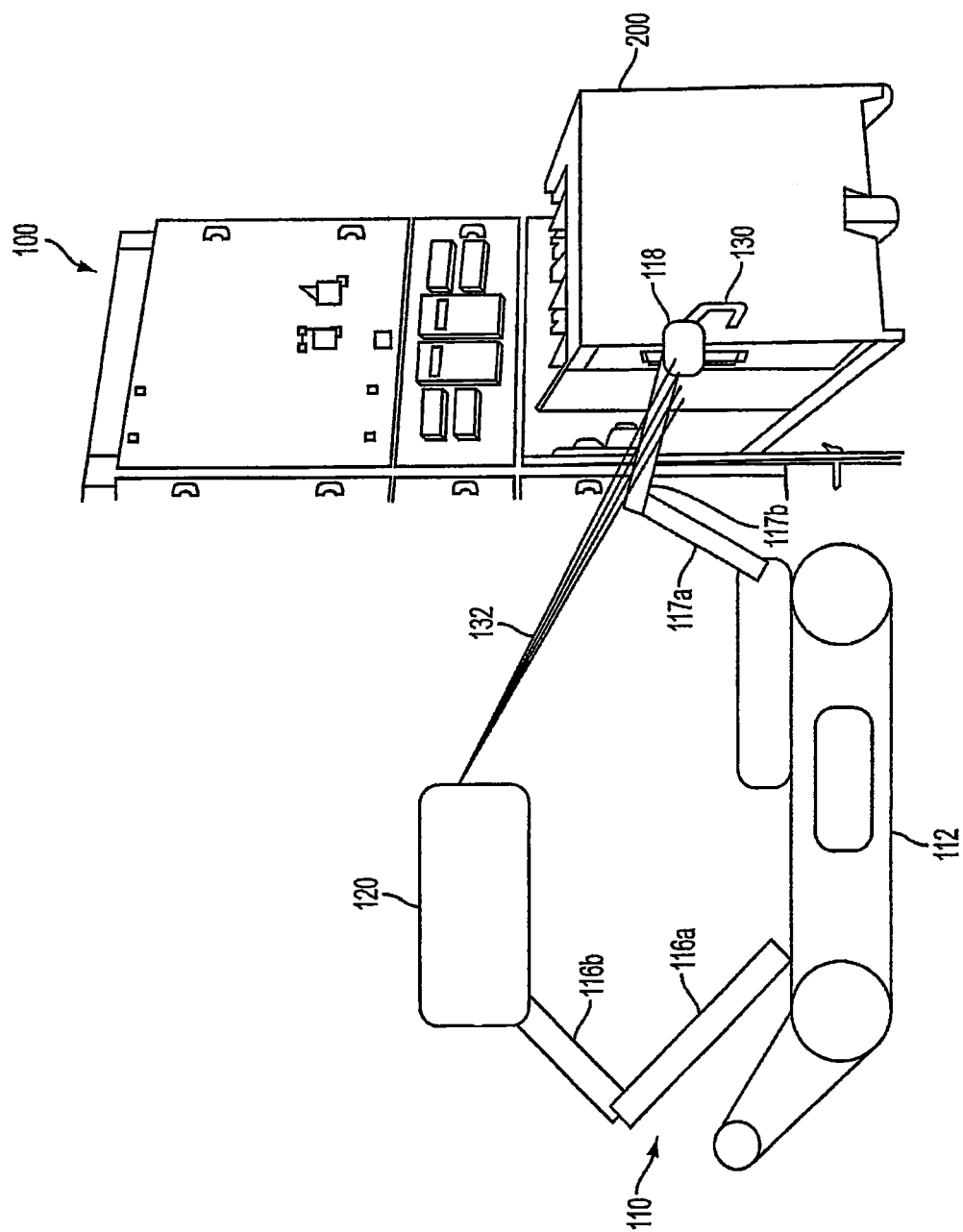
FIG. 9 is an exemplary embodiment of a remote vehicle in accordance with the present teaching.

The remote vehicle illustrated in FIG. 9 can be used, for example, in a racking behavior as described in U.S. Provisional Patent Application No. 61/605,552, filed Mar. 1, 2012, titled Mobile Inspection Robot, the disclosure of which is incorporated herein by reference in its entirety. In a racking behavior, used in an electrical distribution application, a robot can be remotely controlled to prevent human injury from dangerous arc flashing. The remote vehicle can be used to engage and disengage circuit breakers 200 of a switchgear 100, for example an actuator such as actuating a button, handle or lever arm 130. To perform the racking behavior the remote vehicle system locates a circuit breaker, for example in a manner discussed above for locating a door, locates an actuator of the circuit breaker, for example in a manner discussed above for locating a door knob, creating a ray from a focal point of an image of an image sensing device through the actuator, placing the end effector on the ray, moving the end effector along the, ray to the actuator, and contacting and manipulating the actuator as required to engage/disengage the circuit breaker.

Figure 10:
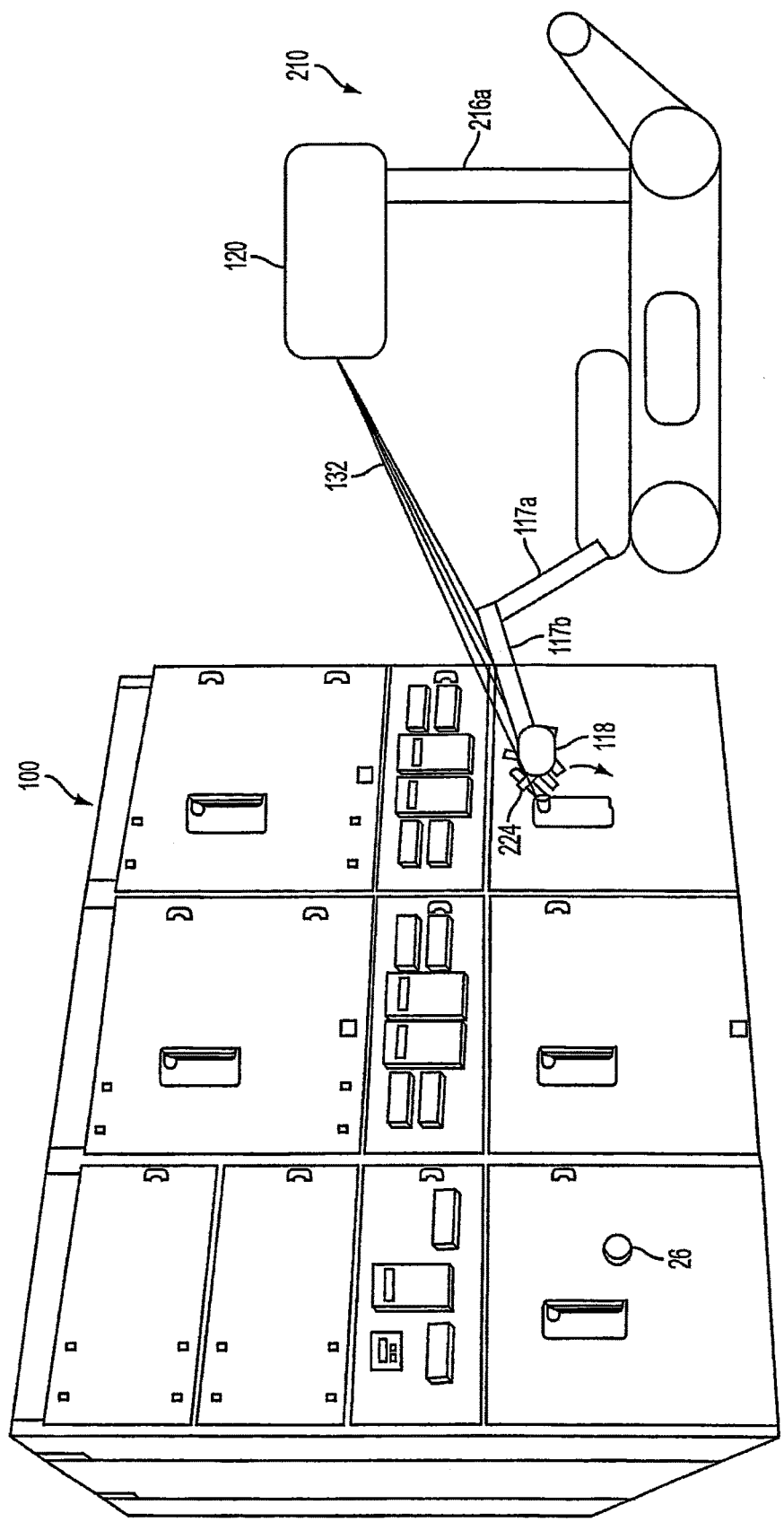
FIG. 10 is an exemplary embodiment of a remote vehicle in accordance with the present teaching.

The exemplary embodiment of FIG. 10 is similar to the embodiment of FIG. 9, but the remote vehicle 210 has a single arm 216a for the image sensing device 120, which fixes the orientation of the images sensing device with respect to the remote vehicle in all aspects besides pan and tilt, and therefore making it easier to determine the coordinates of the ray with the orientation of the image sensing device with respect to the remote vehicle being more straightforward. The position and orientation of the image sensing device 120 and the end effector 118 are determined by forward kinematics. The exemplary remote vehicle of FIG. 10 can, for example, be utilized to perform the racking behavior described above, by locating an actuator 224, creating a ray 132 through the actuator 224 using only 2D image data from the image sensing device 120, moving the end effector 118 along the ray 118 to contact the actuator 224, and actuating the actuator 224.

While it has been shown and described that an operator identifies the object and the surface on which the object is located, alternately, the object and the surface on which the object is located may be identified through computer vision techniques through the image received through the image sensing device 20 and one of the processors 80 or 82.

Some or all of the actions performed by the exemplary embodiments described herein can be performed under the control of a computer system executing computer-readable codes either in a computer-readable recording medium or in communication signals transmitted through a transmission medium. The computer-readable recording medium is any data storage device that can store data for a non-fleeting period of time such that the data can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transmission medium may include, for example, signals which modulate carrier waves transmitted through wired or wireless transmission paths.

The above description and associated figures explain the best mode of the present teachings. Other embodiments will be apparent to those skilled in the art from consideration of the specification and practice of the teachings disclosed herein. It is intended that the specification and examples be considered as exemplary only, with a true scope and spirit, present teachings being indicated by the following claims.

We claim:

1. A method of controlling a remote vehicle having an end effector and an image sensing device disposed thereon to move the remote vehicle to approach an object, the method comprising:
    moving the remote vehicle and the imaging sensing device from an initial pose to a targeting pose at which a focal point of the image sensing device is aligned with the object, wherein the end effector and the image sensing device are both mounted on a multi-unit manipulator arm of the remote vehicle, and wherein moving the remote vehicle and the image sensing device to the targeting pose comprises moving the multi-unit manipulator arm;
    obtaining an image of the object with the image sensing device;
    determining a ray from a focal point of the image to the object based on the obtained image;
    positioning, by moving the multi-unit manipulator arm, the end effector of the remote vehicle to align with the determined ray;
    moving, by moving the multi-unit manipulator arm, the end effector along the determined ray to approach the object;
    grasping the object with the end effector; and
    rotating and/or moving the object by moving the remote vehicle and/or end effector.

2. The method according to claim 1, further comprising providing at least one user input selection option, and receiving a first user input selection from the at least one user input selection option to determine the ray.

3. The method according to claim 2, further comprising receiving a second user input selection from the at least one user input selection option, and controlling the end effector to grip the object after receiving the second user input selection.

4. The method according to claim 3, further comprising receiving a third user input selection from the at least one user input selection option, and moving the image sensor to a targeting pose to view the object within a field of view of the image sensor before displaying the image of the object on the display.

5. The method according to claim 1, wherein the end effector and the image sensing device are both mounted on the multi-unit manipulator arm such that the end effector and the image sensing device are aligned along an arm section of the multi-unit manipulator arm, and wherein moving the end effector along the determined ray to approach the object comprises moving the multi-unit manipulator arm such that the end effector and the image sensing device approach from a same direction as a view from the image sensing device.

6. The method according to claim 1, further comprising detecting whether torque of a motor of the remote vehicle increases after moving the end effector to approach the object, and determining that the end effector reaches the object when the torque of the motor is detected to increase.

7. The method according to claim 1, wherein the remote vehicle comprises a chassis and moving the remote vehicle to approach the object comprises moving the chassis across a planar surface, and the remote vehicle is controlled by an operator that is remote from the vehicle.

8. The method according to claim 1, wherein the end effector is mounted on the multi-unit manipulator arm with a movable structure, and rotating the object comprises moving the movable structure.

9. A method of controlling a remote vehicle having an end effector and an image sensing device to move the remote vehicle to approach an object, the method comprising:
    receiving a first input to move the image sensing device from an initial pose to a targeting pose to view an object within a field of view of the image sensing device, wherein a focal point of the image sensing device is aligned with the object in the targeting pose, wherein the end effector and the image sensing device are both mounted on a multi-unit manipulator arm of the remote vehicle, and wherein moving the remote vehicle and the image sensing device to the targeting pose comprises moving the multi-unit manipulator arm;
    displaying an image of the object obtained from the image sensing device;
    receiving a second input to move the image sensing device to an object alignment position at which a focal point of the image is aligned with the displayed, object;
    determining a ray from the focal point of the image to the object based on the displayed image;
    controlling, by moving the multi-unit manipulator arm, the end effector of the remote vehicle to be positioned to align with the determined ray;
    moving the remote vehicle to approach the object;
    controlling, by moving the multi-unit manipulator arm, the end effector to move along the determined ray to approach the object,
    grasping the object with the end effector; and
    rotating and/or moving the object by moving the remote vehicle and/or end effector.

10. The method according to claim 9, further comprising providing at least one user input selection option, and receiving a first user input selection from the at least one user input selection option to determine the ray.

11. The method according to claim 10, further comprising receiving a second user input selection from the at least one user input selection option, and controlling the end effector to grip the object after receiving the second user input selection.

12. The method according to claim 11, further comprising receiving a third user input selection from the at least one user input selection option, and moving the image sensor to a targeting pose to view the object within a field of view of the image sensor before displaying the image of the object on the display.

13. The method according to claim 9, wherein the end effector and the image sensing device are both mounted on the multi-unit manipulator arm such that the end effector and the image sensing device are aligned along an arm section of the multi-unit manipulator arm, and wherein moving the end effector along the determined ray to approach the object comprises moving the multi-unit manipulator arm such that the end effector and the image sensing device approach from a same direction as a view from the image sensing device.

14. The method according to claim 9, further comprising detecting whether torque of a motor of the remote vehicle increases after moving the end effector to approach the object, and determining that the end effector reaches the object when the torque of the motor is detected to increase.

15. The method according to claim 9, wherein the remote vehicle comprises a chassis and moving the remote vehicle to approach the object comprises moving the chassis across a planar surface, and the remote vehicle is controlled by an operator that is remote from the vehicle.

* * * * *